United States Patent [19]

Mende et al.

[11] 4,226,678

[45] Oct. 7, 1980

[54] METHOD AND APPARATUS FOR THE DECONTAMINATION OF A LIQUID CONTAINING CONTAMINANTS

[75] Inventors: Hanns Mende, Bad Nauheim; Helmut Beuler, Gambach; Rolf Glaum, Butzbach, all of Fed. Rep. of Germany

[73] Assignee: Luwa AG, Zürich, Switzerland

[21] Appl. No.: 808,626

[22] Filed: Jun. 21, 1977

[30] Foreign Application Priority Data

Jul. 1, 1976 [DE] Fed. Rep. of Germany ....... 2629581

[51] Int. Cl.$^{2}$ ............ B01D 3/22

[52] U.S. Cl. ............ 202/161; 261/114 R; 261/114 TC

[58] Field of Search ............ 202/158, 161; 261/114 R, 114 TC; 196/100, 125

[56] References Cited

U.S. PATENT DOCUMENTS

| | | | |
|---|---|---|---|
| 1,748,855 | 2/1930 | Teter | 202/158 |
| 2,651,512 | 9/1953 | Voleav | 202/158 |
| 3,105,105 | 9/1963 | Kittel | 261/114 R |
| 3,162,700 | 12/1964 | Irons | 261/114 R |
| 3,262,684 | 7/1966 | Smith | 202/158 |
| 3,647,192 | 3/1972 | De Grout et al. | 261/114 R |
| 3,969,194 | 7/1976 | Mexide | 202/158 |

*Primary Examiner*—Hiram H. Bernstein

*Attorney, Agent, or Firm*—Spencer & Kaye

[57] ABSTRACT

Decontaminating a liquid—such as a liquid containing radioactive materials—by evaporation, includes the steps of guiding the vapor through plurality of wash liquid baths and guiding the wash liquid through the individual baths substantially in a countercurrent to the vapor. The step of guiding the wash liquid comprises the steps of introducing the wash liquid into each bath along an outer edge zone thereof; guiding the wash liquid in each bath radially inwardly towards a centrally located outlet in each bath; and guiding the wash liquid through the central outlet. The step of guiding the vapor comprises the steps of passing the vapor through the wash liquid in a central zone of each bath and subsequently deflecting the vapor above each bath in a radially outwardly oriented direction.

5 Claims, 7 Drawing Figures

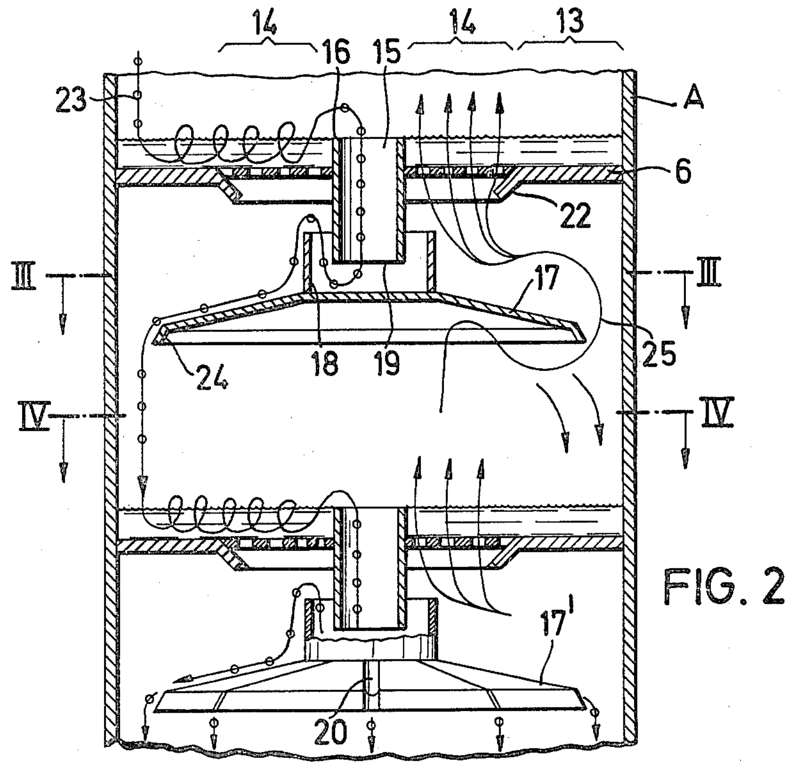
FIG. 2
FIG. 3
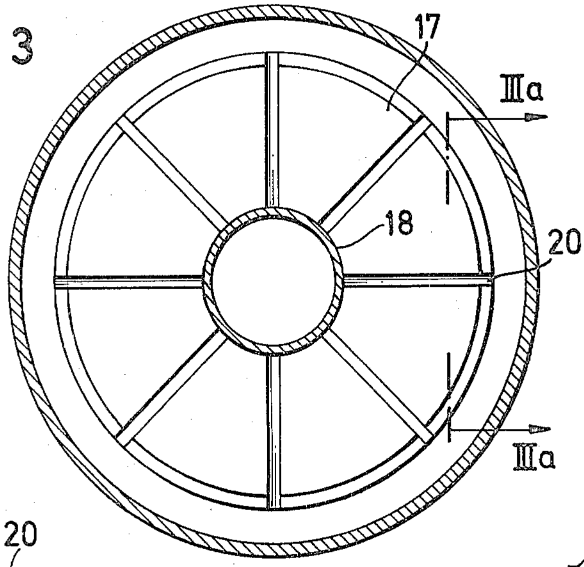
FIG. 3a
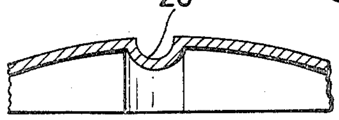
FIG. 3b
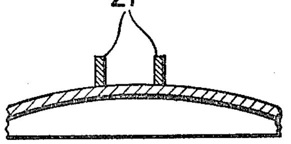

METHOD AND APPARATUS FOR THE DECONTAMINATION OF A LIQUID CONTAINING CONTAMINANTS

BACKGROUND OF THE INVENTION

The present invention relates to a method for decontaminating a liquid by evaporation, particularly a liquid containing radioactive substances, where the evaporated portion of the liquid is conducted through a plurality of washing liquid baths and the washing liquid flows through the individual baths substantially in countercurrent to the evaporated portion (vapor) of the liquid.

Due to the requirements for environmental protection, it has become increasingly necessary to remove contaminants of liquids containing radioactive substances before they are released into public waters. Such purification of the liquid becomes necessary in particular where liquids or waste waters, laden with radioactive substances, are involved. Radioactivity is measured in micro-Curies per $cm^3$ ($\mu Ci/cm^3$) or in Curies per $m^3$ ($Ci/m^3$). According to generally applicable standards, waste waters containing unknown and/or radioactive substances with a long half-life which are discharged into public waters should have a radioactivity below $10^{-7}$ $Ci/m^3$.

It is known that in radioactive waste waters it is not the water which carries the radioactivity; rather such radioactivity is carried by dissolved salts or suspended solids, such as, for example, undissolved salts, oxides, abraded metal particles, etc.

In a known process, the radioactive waste water is evaporated and the vapor, together with drops of the liquid it carries along, is passed through a washing liquid. Thus, a majority of the drops are transferred to the washing liquid. The drops are mixed with the washing liquid so that the radioactive substances contained in the drops are diluted in the washing liquid, reducing the radioactivity per unit volume, for example per $cm^3$. Moreover, the drops carried along by the vapor are separated in drop separators arranged above each plate of the separator. These drop separators are designed as demisters and are manufactured of pressed mats of steel wool or similar materials. By separating the drops in demisters, the latter are enriched with contaminants laden with radioactive substances which adhere to the fabric of the demisters. This increases the radioactivity within the column. Experience has shown that simply rinsing these columns, i.e. the plates and the demisters, does not result in sufficient removal of these radioactive substances.

Columns are also known which employ a plurality of plates on which there is arranged, in addition to an inlet and outlet weir permitting a uniform distribution of the liquid on the column plates, a baffle plate which is fastened above the plate of the column. This baffle plate permits deflection of the vapors passing through the plates or through the liquid collected on the plates whereby liquid drops carried along by the stream of vapor are in part separated from the vapor stream. With this type of drop separation it is accomplished that no impermissible enrichment of radioactive substances can take place at any point in the column.

In using the above-outlined two known methods, it has been found, however, that drop separation alone cannot result in the required final concentration in the distillate; this could be achieved only by significantly increasing the quantity of washing liquid. Yet, this measure requires significantly greater amounts of heat energy, since the additional washing liquid must be evaporated together with the contaminated liquid. Furthermore, it is necessary to enlarge the plate diameter through which the vapor and the drops carried along therewith must pass. This measure likewise makes the entire system more costly.

SUMMARY OF THE INVENTION

It is an object of the invention to provide a method with which the drawbacks of the known devices are avoided and with which a distillate can be obtained, with economically justifiable expenditures, which does not exceed generally applicable safety standards with respect to its residual content of radioactive substances.

This object and others to become apparent as the specification progresses, are accomplished by the invention, according to which, briefly stated, the method of decontaminating a liquid—such as a liquid containing radioactive materials—by evaporation, includes the steps of guiding the vapor through a plurality of wash liquid baths and guiding the wash liquid through the individual baths substantially in a countercurrent to the vapor. The step of guiding the wash liquid comprises the steps of introducing the wash liquid into each bath along an outer edge zone thereof; guiding the wash liquid in each bath radially inwardly towards a centrally located outlet in each bath; and guiding the wash liquid through the central outlet. The step of guiding the vapor comprises the steps of passing the vapor through the wash liquid in a central zone of each bath and subsequently deflecting the vapor above each bath in a radially outwardly oriented direction.

In this method, the vaporized liquid component (referred to simply as "vapor") is passed through a plurality of serially arranged wash liquid baths; in the individual wash liquid baths the radioactivity caused by drops carried by the vapor, continuously decreases when viewed in the direction of vapor flow. This principle is known by itself. The advantage of the method according to the invention resides in that the particular guidance of vapor and washing liquid makes it possible to separate again, from the washing liquid bath, drops of the liquid which have been carried along by the vapor while they are still in the same bath so that the portion of liquid drops carried along by the vapor into the consecutive washing liquid bath is reduced significantly. Consequently, with the same number of liquid baths as used in the prior art, the distillate is decontaminated much better or, in the alternative, it is possible to reduce the number of liquid baths.

The invention also relates to an inexpensive apparatus for safely practicing the method with an evaporation device including a heating device, an inlet for the liquid to be decontaminated and a concentrate outlet. The evaporating device is in communication with a column which comprises a plurality of spaced, superposed plates with passage openings for vapor and washing liquid and provided in the upper region with a vapor discharge and a washing liquid intake.

In the apparatus structured according to the invention, each plate is provided in its central region with a washing liquid port which is in communication with a washing liquid distributor arranged underneath the respective plate and extending into the edge region of the column. Further, a plurality of vapor passage openings are arranged around the washing liquid port. The plate receiving the respective washing liquid bath in the above-described structure according to the invention is simple to manufacture and provides for uniform passage of the washing liquid over the entire bath surface, and wherein any washing liquid particle follows approximately the same path from its entrance into the liquid bath until it reaches the washing liquid port. Such a plate also has practically no "dead" corners which may be present if deflections or the like are provided to lengthen the passage path. Consequently, the plate is easy to clean. Because of the particular, unequivocal guidance of the vapor and the washing liquid, the quantity of washing liquid per unit time which contacts the introduced vapor (the so-called circulation quantity) is substantially greater than the actual quantity of washing liquid passing through (the so-called flowthrough quantity), so that the system as a whole operates much more economically than prior art apparatuses for decontaminating radioactive liquids.

BRIEF DESCRIPTION OF THE DRAWINGS

FIG. 2 is a schematic fragmentary vertical sectional view of the same embodiment on an enlarged scale.

FIG. 3 is a sectional view along line III—III of FIG. 2.

FIG. 3*a* is a fragmentary sectional view along line III*a*—III*a* of FIG. 3.

FIG. 3*b* is a fragmentary sectional view of a modification of the detail shown in FIG. 3*a*.

DESCRIPTION OF THE PREFERRED EMBODIMENTS

Figure 1:
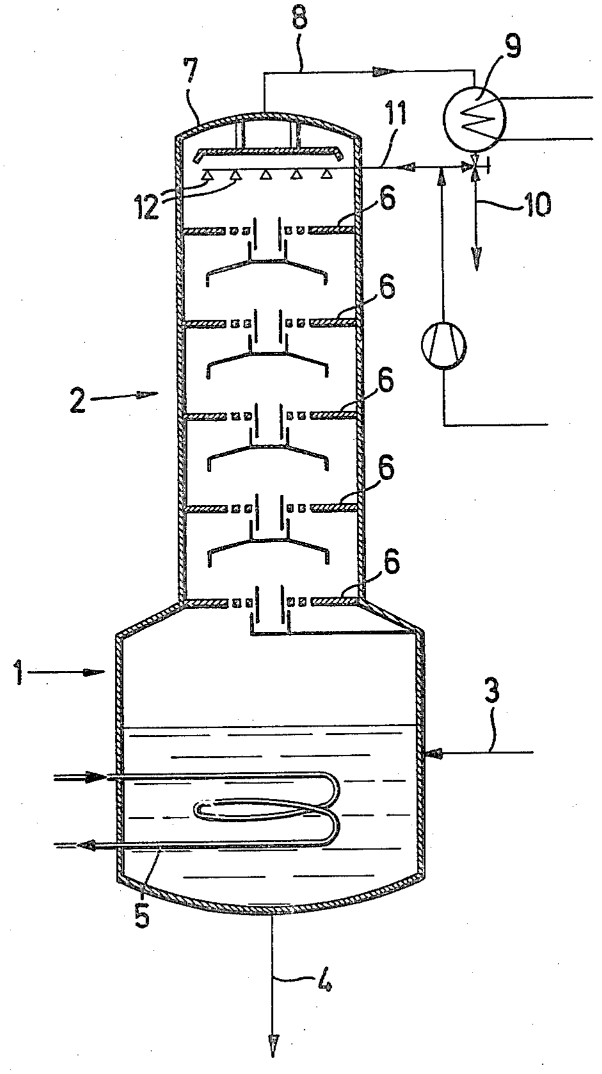
FIG. 1 is a schematic vertical sectional view of a preferred embodiment of the invention.

The device shown in FIG. 1 includes an evaporator part 1 with a superposed purification column 2. The evaporator part is provided with an inlet 3 for the liquid to be purified and an outlet 4 for the concentrate. A heating device 5 shown schematically as a heating coil, heats the liquid present in the evaporator 1 and thus causes it to be evaporated. The purification column 2 is subdivided by a plurality of plates 6 whose structure will be described in detail in connection with FIGS. 2 through 5. These plates are designed so that they permit the vapor generated in the evaporator part 1 to pass in an ascending direction so that the vapor can finally be extracted through an extraction line 8 in the area of the column head 7 and can be fed to a condenser 9. A return line 11 branches off from the distillate discharge line 10 of the evaporator and extends into the column 2 above its uppermost plate where it is provided with a series of outlet nozzles 12. The portion of the liquid returning into the column through return line 11 serves as a washing liquid for the vapor rising from evaporator 1. The liquid is guided in such a manner that it returns to the evaporator 1 substantially in countercurrent to the vapor.

FIG. 2 shows, on an enlarged scale, an embodiment of the purification stages formed of the individual plates. Plate 6 has a closed edge portion 13 which is sealingly connected to column wall A. Depending on the corrosivity of the liquid to be treated, the plate may be connected with the column wall either permanently or releasably. The outer, annular edge portion 13 is followed, toward the center, by a likewise annular vapor passage member 14 which is bounded in the center by a liquid passage (port) 15. The latter is designed as a tube so that it forms an overflow edge 16 which protrudes beyond the top of the plate surface.

A baffle plate 17 is arranged at a distance below plate 6 and is provided on its upper side with an overflow rim 18 which encloses, with a clearance, the lower opening 19 of the tubular liquid port 15, and which protrudes upwardly beyond the opening 19.

The baffle plates, as can be seen in the illustration of the baffle plate 17′ as well as in the top view of FIG. 3, have a substantially conical design and have, at their upper face, a plurality of trough-shaped depressions 20 which extend radially from the overflow edge 18 toward the outer, peripheral edge of the respective baffle plate. FIG. 3*a* shows that the troughs 20 may be formed, for example, by an embossing operation. FIG. 3*b* shows another embodiment of the troughs, illustrating that they may be formed, for example, by webs arranged on the upper side of the respective baffle plate.

On the underside of each plate 6, at the border line between the outer edge portion 13 and the vapor passage member 14, there is arranged a downwardly oriented rim 22. The vapor passage member itself may be—as in the illustrated embodiment—a so-called sieve plate or it may have the shape of a bell or valve plate as used in the prior art. The above-described apparatus operates as follows:

The liquid to be purified is introduced into evaporator 1 through inlet line 3 and is heated by heating device 5 until the liquid to be purified evaporates. Since enough washing liquid, for example water, has been introduced into the column through return line 11 to completely cover each one of plates 6 with liquid, the vapor must pass through the liquid disposed over the vapor passage member of each plate. The vapor speed is sufficiently high so that no washing liquid will pass through the openings in vapor passage member 14. In the zone of column head 7 the vapor is eventually extracted from the column 2 via vapor extraction line 8 and is condensed in the condenser 9. Part of the distillate is removed through discharge line 10 while another part of the distillate is re-introduced, preferably in a controllable manner, into the column as washing liquid through nozzles 12.

The path of the vapor and the path of the liquid in the zone of the plates will be explained in detail with the aid of the enlarged illustration of FIG. 2. The washing liquid which is introduced from the top is retained on each plate by overflow edge 16 and the vapor which is flowing from the bottom to the top prevents its passage through the openings of the vapor passage member 14. Since washing liquid is continuously replenished from the top, the overflow liquid passes through liquid passage 15 into the cup formed by the overflow edge 18 of each baffle plate 17 and thereafter flows out over the edge and the surface of the baffle plate 17. Troughs 20 (FIG. 3*a*) or 21 (FIG. 3*b*) provided in the surface of the baffle plate conduct the liquid radially outwardly so that it reaches the edge region of the next lower plate. The path of the liquid is shown in FIG. 2 by the solid line 23.

The vapor rising from below passes through the openings of vapor passage member 14 and is then deflected to the edge region by the underside of baffle plate 17 thereabove and, in cooperation with the rim 22 of the overlying plate, is directed back to the central region of the column. The liquid drops which contain radioactive substances in dissolved or solid form and which are carried along by the vapor during the evaporation process and during each passage through a liquid bath on each plate, are deposited at the underside of each baffle plate and return, in the form of larger drops and rivulets of liquid, back to the edge region where they drop back into the liquid bath. In the deflector zone 24 of the baffle plate the drops are again deflected sharply so that droplets possibly still contained in the vapor as well as drops in the edge region of the abutment plate are torn away by the stream of vapor, yet are not carried along upwardly, but, due to developing centrifugal forces, are thrown toward the wall A of the column. The downwardly oriented circumferential rim 22 of the overlying plate again sharply deflects the drops so that drops which might still be carried in the vapor into this zone are separated and fall back to the surface of the baffle plate 17. The remaining drop-shaped components in the vapor are now separated during passage through the liquid bath on the next plate through which they flow.

Since, as the vapor passes through each liquid bath, drops are picked up by the vapor from the bath, even the liquid baths of the uppermost plates of the column would, in the course of time, be charged with radioactive particles. This is counteracted in that a certain portion of the washing liquid is always newly introduced into the column so that the radioactivity of the washing liquid at the uppermost one of the column plates can be kept below the prescribed values. The particular advantage of the described apparatus is that theoretically every liquid particle travels the same path from the edge of the column to the centrally disposed liquid passage 15, and a transverse or cross-wise current is maintained in all areas between each two plates between the washing liquid and the vapor. This has the result that the quantity of washing liquid with which the vapor comes into the contact per unit time in the zone of one plate and thus the possibility of separating droplets that are carried along, is substantially higher than the liquid flowthrough quantity through the entire apparatus so that significant cost advantages result regarding the amounts of washing liquid as well as energy required.

Figure 5:
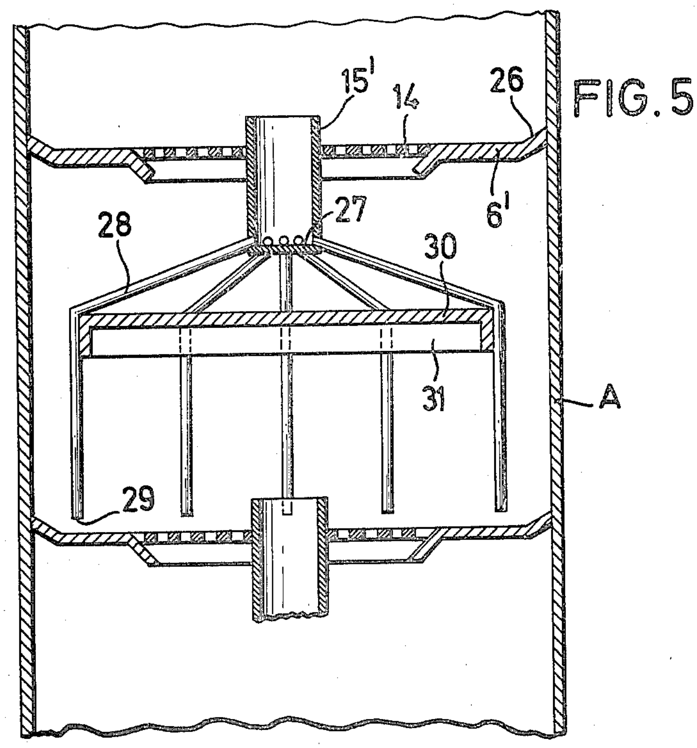
FIG. 5 is a schematic fragmentary vertical sectional view of another preferred embodiment of the invention.

The embodiment according to FIG. 5 has the same operational features as that of FIGS. 2 and 3, but its structure is modified. Each plate 6' used in this embodiment is slightly bent upwardly in its zone 26 adjacent the column wall A so that during emptying of the column, the liquid can completely run off the plate.

The liquid distribution during transfer of the liquid from one plate to the next is, in the FIG. 5 embodiment, likewise effected through a tubular liquid passage 15' which, however, is closed by a plate 27 at its lower end. In order to distribute the liquid to the plate therebelow, the lower end of liquid passage 15' is connected to a plurality of tubes 28 which extend radially outwardly to the edge zone and are then bent downwardly in an approximately vertical direction. The discharge opening 29 of each tube 28 is disposed closely above the plate below, so that the openings are submerged in the liquid bath forming on the plate below and no vapor can travel upwardly through the tubes 28. In this embodiment also, at a distance below each plate 6' a baffle plate 30 is disposed serving, however, only to deflect the vapor while the distribution of the liquid on the plate therebelow is effected by the tubes 28. The baffle plate 30 may be either planar (as illustrated) in which case it is expedient to provide them with a downwardly oriented deflecting rim 31, or it may be designed to be slightly curved upwardly so as to assure good outflow of the accumulating liquid drops.

Figure 4:
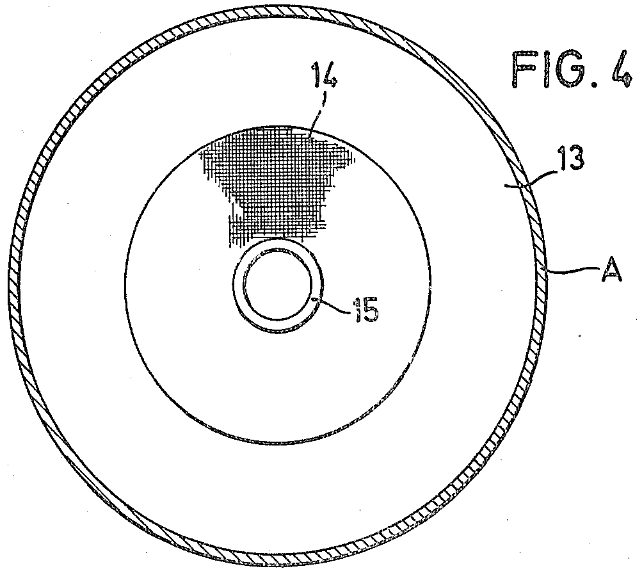
FIG. 4 is a sectional view along line IV—IV of FIG. 2.

The vapor passage member 14 of the above-described plates may be designed either as a bell plate or as a valve plate as is known in principle in the chemical apparatus art. The design of a so-called sieve plate, as shown in detail in FIG. 4, is, however, of particular advantage since in the present case it is important to obtain as few dead zones in the region of each plate as possible so that only few residues—if any at all — can settle on the plates, as it must be avoided under all circumstances that during the decontamination of radioactive liquids the radioactivity of the column itself rises and thus the residues prevent the attainment of a sufficient degree of purity for the distillate. In a plate of the design with a sieve-like vapor passage member in the above-described embodiments, the column can be cleaned practically completely by rinsing since upon completion of the evaporation process the wash liquid present on each plate can completely run off within a very short time and radioactive components which might settle during a subsequent rinsing process can be rinsed out in solid form. Of particular advantage here, too, is the radial direction the liquid takes on the plates and on the baffle plates of the embodiment of FIG. 2 which serve as the washing liquid distributors. The washing liquid which accumulates on the lowermost plate is taken continuously to the evaporator 1, so that in the course of time the concentration of dissolved salts and solids in the liquid in the evaporator member and thus the radioactivity of this portion of the liquid increases. Consequently, when a certain concentration or radioactivity has been reached, the liquid can be extracted through discharge nipple 4 and can be stored separately.

If the liquid to be evaporated contains more than one radioactive contaminant, for example, radioactive and inactive antimony on the one hand and iodine on the other hand, the evaporator can no longer be operated in the same manner as if only one of these substances were present. Rather, the washing liquid and thus also the liquid to be evaporated in the evaporator sump must be conditioned appropriately so that the chemical bonds of the substances are not broken or are newly formed in the area of the washing liquid baths and the substances cannot enter into the distillate.

In the case of a liquid which is charged with radioactive antimony and radioactive iodine, it is advisable to condition the evaporator sump so that a pH of 2–4 is maintained and the antimony remains chemically bound in the zone of the evaporator. The iodine component, however, volatilizes and, together with the evaporated portion of the liquid, travels through the washing liquid baths into the distillate. If now a base liquor, for example sodium liquor, is added as conditioner to the washing liquid which has been branched off from the distillate in the zone of the return line 11 so that the washing liquid in the individual washing liquid baths has a pH of 8–10, the vaporous iodine contained in the evaporated portion of the liquid is chemically bound in the washing liquid from the gaseous phase and the vaporous iodine component is thus prevented from reaching the distillate. The same effect can also be achieved, in the case of iodine, with a neutral conditioner (e.g. sodium thiosulfate).

The chemically bound iodine will accumulate in the washing liquid on the plates. From there it must be removed either in batches or continuously by lateral extraction from one or two plates. This extracted substance can be added, for example, to the final concentrate of the sump liquid.

The above-mentioned pH settings may also be interchanged so that the iodine present in the liquid to be evaporated will not volatilize during the evaporation process while the volatilized antimony is chemically bound in the washing liquid by correspondingly setting the later to a pH of 2–4. The quantities of chemicals required for this purpose are small. For example, acidifying a washing liquid of 800 liters from a pH of 7 to a pH of 6 requires only about 0.05 g of 100% nitric acid. Acidifying to a pH of 5 requires only about a 0.5 g and acidifying to a pH of 4 requires the addition of only about 5 g of 100% nitric acid. With these quantities of chemicals, which are small compared to the total quantity involved, it is possible without difficulties to maintain, in the given example, a pH of 8–10 in the evaporator sump.

It is to be understood that the above description of the present invention is susceptible to various modifications, changes and adaptations, and the same are intended to be comprehended within the meaning and range of equivalents of the appended claims.

What is claimed is:

1. In an apparatus for decontaminating a liquid by evaporation, including an evaporator having a heating means, inlet means for introducing the liquid to be decontaminated, outlet means for removing the concentrate; the apparatus further including a vertical column coupled to the evaporator and having a column wall, means defining, in an upper zone of the column, an inlet for introducing wash liquid and an outlet for removing the vapor generated in the evaporator; a plurality of horizontally oriented superposed plates arranged in a spaced relationship along the length of the column and connected tightly to the walls of the column; each plate having a wash liquid port arranged in a central zone of the respective plate; and a wash liquid distributing means arranged between each two plates and operatively connected to the wash liquid port associated with the plate located immediately above the respective wash liquid distributing means; the improvement wherein each plate has a first annular zone immediately surrounding said wash liquid port and containing vapor passages and a second annular zone immediately surrounding said first annular zone and being in circumferential contact with the column walls; said second annular zone being void of apertures; the improvement further comprising a horizontally oriented baffle plate arranged between each two plates and spaced therefrom, each said baffle plate fully overlapping the first annular zone of the plates situated immediately above and immediately below the respective baffle plate; each said baffle plate having a perimeter spaced from said column wall; and further wherein said wash liquid distributing means includes a plurality of tubes arranged in an array about the respective wash liquid port and being attached to the perimeter of the underlying baffle plate; each said tube having a first portion extending radially outwardly and downwardly from the respective wash liquid port to the perimeter of the underlying said baffle plate; each said tube further having a second portion extending vertically downwardly from said perimeter to a location close to and immediately above the second annular zone of the respective underlying plate and terminating by a vertically downwardly oriented discharge opening, whereby the wash liquid is discharged solely onto the second annular zone of each respective plate for radial inward flow on the first annular zone of the respective plate and further whereby the vapors passing vertically through the first annular zone of said plates impinge upon the overlying baffle plate and are deflected thereby to pass through an annular clearance defined by the column wall and the perimeter of the respective baffle plate to the first annular zone of the next overlying plate.

2. An apparatus as defined in claim 1, wherein each plate further comprises a downwardly oriented rim surrounding said vapor passages.

3. An apparatus as defined in claim 1, wherein each baffle plate has, along its outer circumference, a downwardly oriented deflector rim.

4. An apparatus as defined in claim 1, wherein said vapor passages are formed by a sieve-like zone constituting said first annular zone of each plate.

5. An apparatus as defined in claim 1, wherein an outer annular marginal portion of the second annular zone of each plate slopes upwardly toward the column walls.

* * * * *